UNITED STATES PATENT OFFICE.

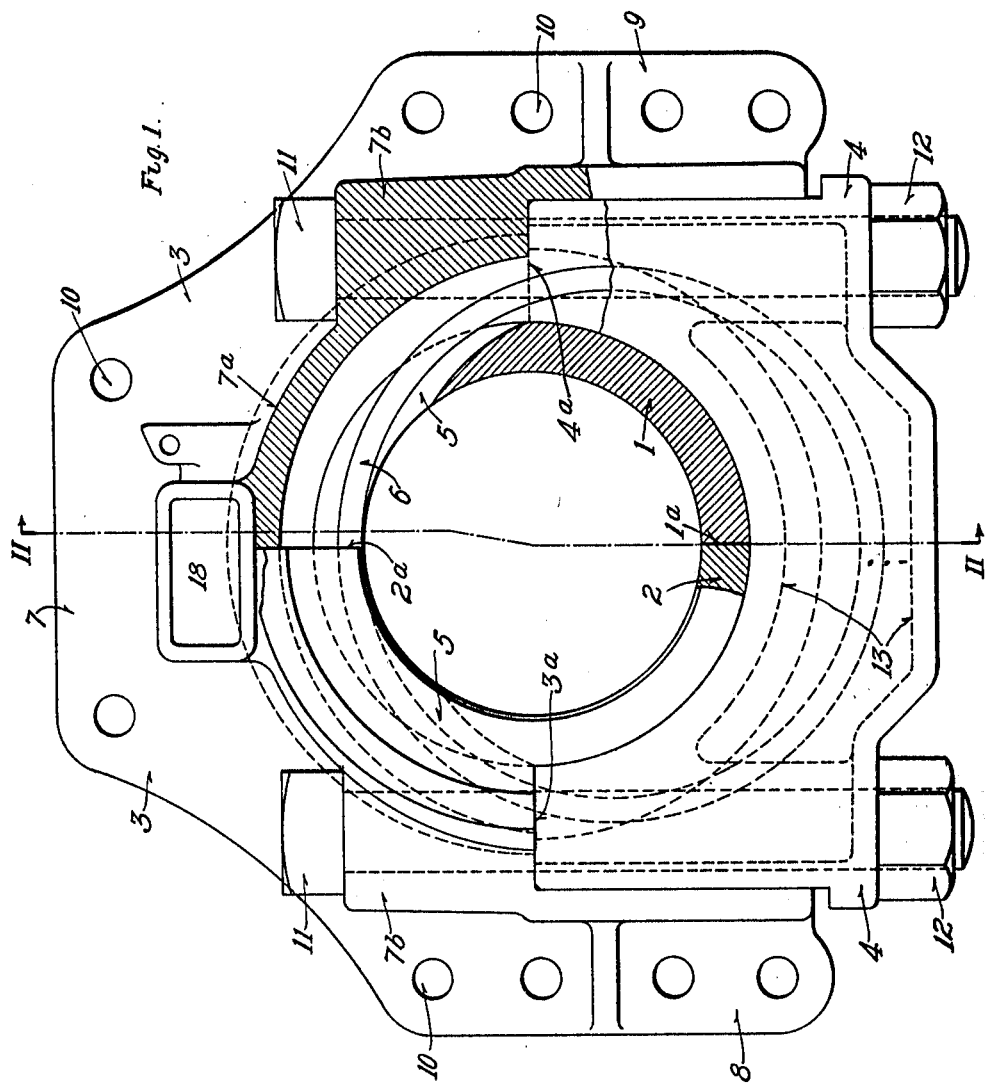

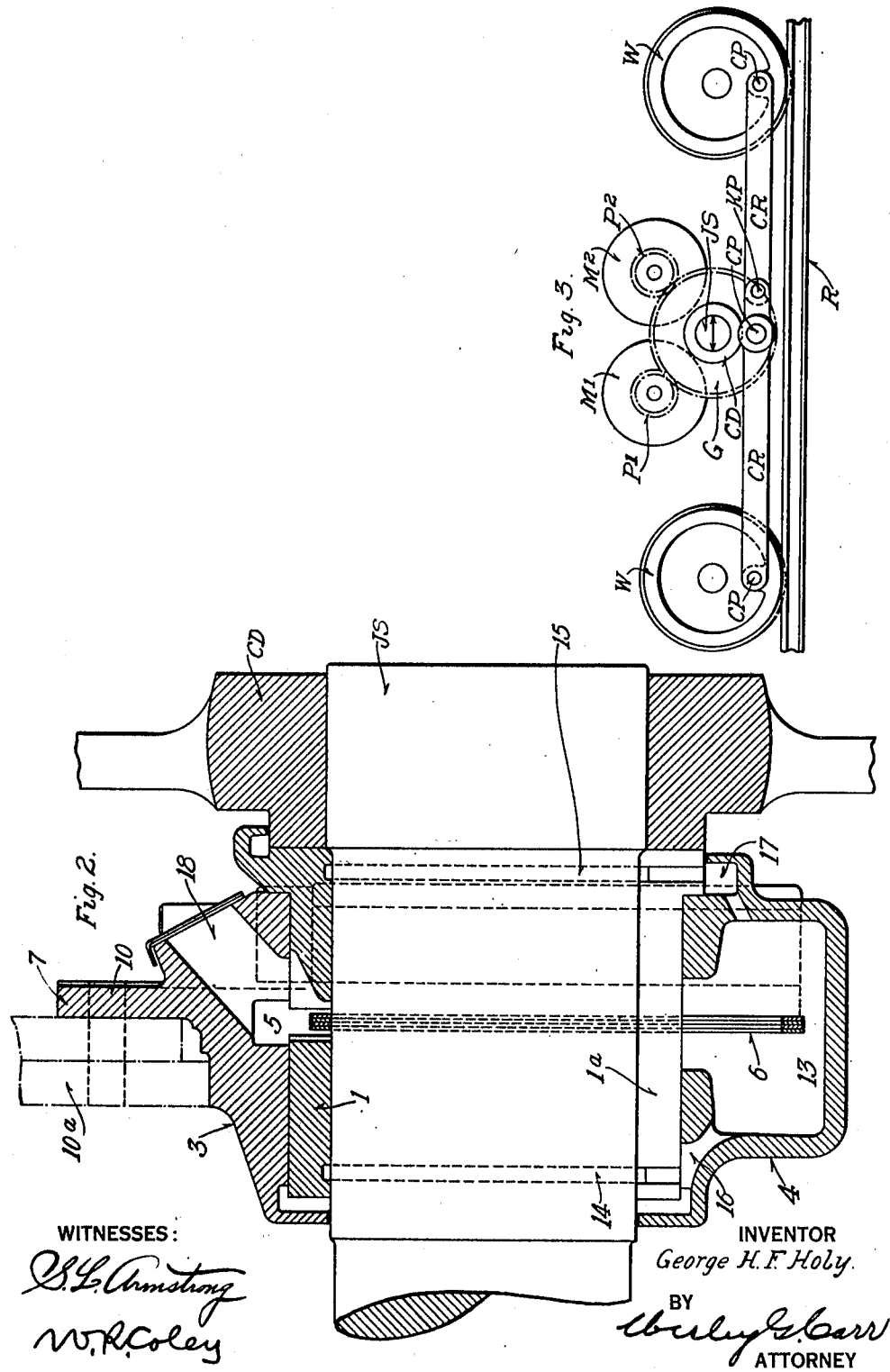

GEORGE H. F. HOLY, OF PITTSBURGH, PENNSYLVANIA, ASSIGNOR TO WESTINGHOUSE ELECTRIC AND MANUFACTURING COMPANY, A CORPORATION OF PENNSYLVANIA.

BEARING.

1,314,518.     Specification of Letters Patent.     Patented Sept. 2, 1919.

Application filed February 3, 1915. Serial No. 5,871.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Bearings, of which the following is a specification.

My invention relates to shaft bearings, and it has special reference to bearings for locomotive jack-shafts and the like.

The object of my invention is to provide a rugged, compact device of the above-indicated character which shall permit of ready assembly and dismounting without requiring removal of the adjacent apparatus.

More specifically stated, it is the object of my invention to provide a split bearing for jack shafts wherein the plane of the bearing-brass split lies in a location to receive a minimum average thrust from a set of connecting rods and wherein parts of the bearing-housing are advantageously located with respect to the assembly of parts and also to the lubrication of the bearing.

Heretofore, in many electric locomotives embodying split bearings for jack-shafts and connecting-rods for joining the jack-shafts and the vehicle wheels, the line of maximum average thrust on the shaft-bearing has been substantially horizontal. Inasmuch as the split of the bearing-brasses has customarily also been horizontal, more or less crushing and undue wear on the bearing has been experienced, as will be appreciated. Moreover, in bearing-housings of the customarily employed type embodying lower main positioning and supporting members and upper relatively small cap-members, considerable difficulty has been encountered in assembling or removing the bearing through the top of the housing in the crowded space beneath the vehicle floor by reason of the necessity of first removing adjacent apparatus, such as the connecting-rods or the crank disk.

According to my present invention, I provide a pair of jack-shaft bearing-brasses that are split in a substantially vertical direction, whereby solid portions are disposed in the substantially horizontal line of maximum average thrust of a set of connecting rods for vehicle wheels, and a pair of housing members that are split in a materially different direction from the first split, preferably along a horizontal line. The bearing-housing comprises an upper main positioning and supporting member and a lower relatively small cap-member that is also adapted to act as a lubricant receptacle for an oil-ring system of lubrication. In these ways, the above-mentioned operating and assembly difficulties are effectively obviated, inasmuch as a relatively small average thrust obtains in the line of the bearing-brass split and the lower cap member may be readily removed to permit of over-hauling of the bearing from below without disturbing adjacent apparatus on the locomotive.

In the accompanying drawing, Figure 1 is a view, partially in front elevation and with parts broken away, of a jack-shaft bearing constructed in accordance with my invention; and Fig. 2 is a sectional view taken on the line II—II of Fig. 1 and also showing a section of a portion of the running-gear that is illustrated in Fig. 3, which is a diagrammatic view of one type of running-gear that may be employed in an electric locomotive embodying my invention.

Referring first to Fig. 3, the apparatus shown comprises a pair of rails R upon which a plurality of suitable wheels W of a vehicle (not shown) are adapted to run; and a plurality of propelling motors $M^1$ and $M^2$ that are respectively provided with pinions $P^1$ and $P^2$ for severally meshing with a gear wheel G that is mounted upon a transversely extending jack-shaft JS of the locomotive or other vehicle. A crank disk CD is disposed near the end of the jack-shaft JS and, by means of a plurality of suitable crank-pins CP, connecting rods CR and a knuckle-pin KP, may be connected to the wheels W of the vehicle.

It will be noted that the arrangement of parts of the running-gear is such that the lateral jack-shaft thrust is, on the average, greater along a horizontal line than in any other direction, inasmuch as, when the connecting rods CR occupy a position in horizontal alinement with the jack-shaft JS, the total thrust is along the horizontal, and, at other times, a certain component of the total thrust is exerted in the horizontal direction, except when the intermediate crank-pin CP occupies either its highest or its lowest position, when, for an instant, the jack-shaft bearing has to support practically only the weight of the various parts. Thus, the greatest average thrust and the resultant greatest wear and pressure on the jack-shaft bearing occur along approximately a horizontal line through the center of the bearing, as indicated by the arrow heads, and my bearing is so designed as to dispose solid portions of the bearing-brass in this line of maximum thrust, as hereinafter more fully set forth.

Referring now to Fig. 1, the structure shown comprises a pair of shaft-encircling members or bearing-brasses 1 and 2 that have the splits $1^a$ and $2^a$ between them extending in a substantially vertical direction; an upper main positioning and supporting member or bearing-housing member 3; and a lower relatively small cap member 4, the two parts 3 and 4 being collectively adapted to form a suitable bearing-housing.

The bearing-brasses 1 and 2 are provided with inclined side-openings 5 which are adapted to receive a suitable oil ring 6, the upper portion of which is thus adapted to rest upon the jack-shaft JS and the lower portion of which extends within the cap member 4, as hereinafter described.

The upper housing-member 3 comprises an upwardly-extending base plate 7, an integrally formed cylindrical member $7^a$, a pair of standards or upwardly-projecting lugs $7^b$ that are formed integrally with the member $7^a$ and are respectively disposed at opposite sides of the jack-shaft and a pair of base-plate members 8 and 9 that respectively extend downwardly from the sides of the base-plate member 7 and are respectively disposed outside of the corresponding standards $7^b$.

The base-plate members 7, 8 and 9 are provided with a plurality of suitable openings or bolt-holes 10 to receive a plurality of bolts (not shown) that suitably secure the bearing housing to the locomotive side-frame or to a portion of the truck frame, as may be desired, and as indicated by the dotted lines at $10^a$ in Fig. 2.

The lower cap-member 4 is adapted to inclose the lower half of the jack-shaft bearing, being disposed between the base-plate members 8 and 9, and the respective sides of the cap-member 4 being disposed beneath the corresponding standard $7^b$. The splits or lines of contact $3^a$ and $4^a$ between the upper housing member 3 and the lower cap member 4 thus extend in a substantially horizontal direction. A plurality of bolts 11 extend, in a substantially vertical direction, through each standard $7^b$ and the corresponding portion of the cap-member 4, and a plurality of nuts 12 are secured to the lower ends of the bolts 11 beneath the respective sides of the cap-member. A suitable well or receptacle 13, for oil or other appropriate lubricant, is disposed in the central portion of the cap-member 4 and is adapted to suitably receive the lower portion of the oil ring 6 for effecting lubrication of the jack-shaft bearing, in accordance with well-known principles.

The jack-shaft JS is preferably provided with a plurality of spaced oil-throwing projections 14 and 15 that respectively communicate with the lubricant-receptacle 13 by means of suitable channels or grooves 16 and 17 in the cap-member 4. A suitable opening 18 is located in the cylindrical member $7^a$ above the jack-shaft for the purpose of permitting ready inspection of the operation of the oil ring 6, in accordance with familiar practice.

Assuming the parts to occupy the positions shown, the method of disassembly may be described as follows: the crank disk CD or the jack-shaft JS is first suitably externally supported by means of a lifting jack, for example, and the nuts 12 may then be removed from the bolts 11 to permit the removal of the cap-member 4. The oil ring 6 may then be momentarily lifted out of the side-openings 5 and the bearing-brasses 1 and 2 may be rotated substantially a quarter-turn to bring the splits $1^a$ and $2^a$ along a substantially horizontal line. The oil ring 6, at this time, will be resting upon the outer surface of one of the bearing brasses. The bearing-brass that then occupies the lower position may be readily removed from below and, by a subsequent half-turn of the other bearing brass, it also may be taken out.

It will thus be seen that I provide a bearing wherein the split of the bearing-brass is located in a direction to receive a relatively small average thrust, that the line of maximum average thrust passes through solid portions of the bearing-brasses, and that the arrangement of parts is such as to permit ready removal without requiring any disturbance of the adjacent apparatus on the locomotive.

I do not wish to be restricted to the specific structural details or arrangement of parts herein set forth, as various modifications thereof may be made within the spirit and scope of my invention; and I desire, therefore, that only such limitations shall be imposed as are indicated in the appended claims.

I claim as my invention:

1. In a shaft bearing for a horizontal shaft, a hollow cylindrical bearing member engaging the shaft and split in a substantially vertical direction, an upper main housing having downwardly extending side portions, and a cap member disposed between said side portions and held in place by bolts substantially parallel to the plane of said split, said cap member having a lubricant chamber in it for supplying lubricant to the bearing and serving to rigidly secure said bearing member in place.

2. The combination with a shaft, of an operating device therefor adapted to produce a maximum lateral thrust in a predetermined direction, a bearing comprising a hollow substantially cylindrical bearing brass engaging the shaft, said brass being split in a direction to dispose solid parts in the direction of said maximum thrust, a bearing housing split in a materially different direction from said first split, the lower part of the housing having a lubricant chamber formed in it, and oil rings surrounding the shaft and projecting into said chamber.

3. The combination with a jack shaft having a maximum thrust exerted on it in a horizontal direction, and exerting a maximum thrust in a horizontal direction, of a bearing for supporting said shaft comprising complementary bearing brasses having their abutting edges disposed in a vertical plane whereby solid portions of the brasses are disposed in the direction of the maximum thrust, and a housing for said brasses comprising complementary members having abutting edges disposed in a plane intersecting said vertical plane, the lower portion of said housing having a lubricant chamber formed in it.

4. In a bearing for a shaft, a hollow cylindrical bearing member engaging the shaft and split in a substantially vertical plane, a housing for securing said bearing member rigidly in position, said housing being split in a substantially longitudinal central plane and having a removable cap located below the shaft and adapted to contain the bearing lubricant.

5. In a locomotive jack-shaft bearing, a substantially cylindrical bearing member engaging the jack shaft, said bearing member being split in a central vertical plane, a housing for securing the bearing member in position and split in a materially different direction from the split in said bearing member, said housing embodying a cap located below the bearing member and having an oil chamber formed in it, and oil rings surrounding the shaft and supplying oil from the oil chamber to the bearing.

In testimony whereof I have hereunto subscribed my name this 30th day of Jan., 1915.

GEORGE H. F. HOLY.

Witnesses:
J. W. AUREN,
B. B. HINES.

Copies of this patent may be obtained for five cents each, by addressing the "Commissioner of Patents, Washington, D. C."